United States Patent
Suominen

(10) Patent No.: US 11,451,584 B2
(45) Date of Patent: Sep. 20, 2022

(54) DETECTING A REMOTE EXPLOITATION ATTACK

(71) Applicant: F-Secure Corporation, Helsinki (FI)

(72) Inventor: Mikko Suominen, Helsinki (FI)

(73) Assignee: Withsecure Corporation, Helsinki (FI)

(*) Notice: Subject to any disclaimer, the term of this patent is extended or adjusted under 35 U.S.C. 154(b) by 264 days.

(21) Appl. No.: 16/427,470

(22) Filed: May 31, 2019

(65) Prior Publication Data

US 2019/0379693 A1   Dec. 12, 2019

(30) Foreign Application Priority Data

Jun. 8, 2018 (GB) .................................. 1809427

(51) Int. Cl.
H04L 9/40 (2022.01)

(52) U.S. Cl.
CPC ...... H04L 63/1466 (2013.01); H04L 63/1416 (2013.01)

(58) Field of Classification Search
CPC ............. H04L 63/1466; H04L 63/1416; H04L 63/145; H04L 63/1408; G06F 21/554; G06F 21/566
USPC ......................................................... 726/23
See application file for complete search history.

(56) References Cited

U.S. PATENT DOCUMENTS

| | | | | |
|---|---|---|---|---|
| 5,935,245 A * | 8/1999 | Sherer | ................. | H04L 63/1475 709/200 |
| 7,523,499 B2 * | 4/2009 | Wilkins | .............. | H04L 63/1408 726/23 |
| 8,000,698 B2 * | 8/2011 | Wolman | .............. | H04L 63/1408 455/410 |
| 8,631,464 B2 * | 1/2014 | Belakhdar | ............. | G06F 21/316 726/22 |
| 8,695,063 B2 * | 4/2014 | Kholaif | ................. | H04W 48/16 713/153 |
| 8,776,226 B2 * | 7/2014 | Boteler | ............... | H04L 63/1425 726/23 |
| 9,680,951 B1 * | 6/2017 | Graham-Cumming | ...................... | H04L 67/563 |
| 10,142,357 B1 * | 11/2018 | Tamersoy | ............. | G06F 21/554 |
| 10,348,751 B2 * | 7/2019 | Kamiya | ............... | H04L 63/1425 |
| 2009/0182854 A1 * | 7/2009 | Sun | ........................ | H04L 49/351 709/223 |
| 2010/0154057 A1 * | 6/2010 | Ko | ........................ | H04L 63/1458 726/13 |
| 2011/0222410 A1 * | 9/2011 | Prasad | ................ | H04W 12/122 370/241 |
| 2013/0031037 A1 * | 1/2013 | Brandt | .................... | H04L 63/20 706/12 |
| 2015/0256431 A1 * | 9/2015 | Buchanan | ........... | H04L 63/1408 709/224 |
| 2015/0256551 A1 * | 9/2015 | Kang | ................... | H04L 63/1408 726/23 |

(Continued)

*Primary Examiner* — Badri Narayanan Champakesan
(74) *Attorney, Agent, or Firm* — Harrington & Smith

(57) ABSTRACT

A method of protecting a computer system against remote exploitation attacks performed over a network to which the computer system is connected. The method includes:
 a) identifying a network connection that is not associated with a successful authentication and which carries a traffic level in excess of a predefined threshold;
 b) reporting the identified network connection as a real or potential remote exploitation attack; and
 c) taking an action or actions to mitigate against the real or potential remote exploitation attack.

15 Claims, 2 Drawing Sheets

(56) References Cited

U.S. PATENT DOCUMENTS

| | | | | |
|---|---|---|---|---|
| 2015/0358338 A1* | 12/2015 | Zeitlin | ............... | H04L 63/1416 |
| | | | | 726/23 |
| 2016/0226896 A1* | 8/2016 | Bhogavilli | .......... | H04L 63/1416 |
| 2016/0277926 A1* | 9/2016 | Molina | ................ | H04W 12/06 |
| 2016/0315959 A1* | 10/2016 | Peterson | ............. | H04L 63/1425 |
| 2017/0046701 A1* | 2/2017 | Hey | .................... | G06Q 20/405 |
| 2017/0177901 A1* | 6/2017 | Lancaster | ........... | G06F 21/6245 |
| 2017/0195346 A1* | 7/2017 | Be'Ery | .................. | H04L 63/10 |
| 2017/0310693 A1* | 10/2017 | Howard | ................ | H04L 63/166 |
| 2017/0310703 A1* | 10/2017 | Ackerman | ......... | H04L 63/1425 |
| 2018/0004948 A1* | 1/2018 | Martin | ............... | H04L 63/1425 |
| 2018/0077174 A1* | 3/2018 | Hebert | ............... | H04L 63/1425 |
| 2018/0091559 A1* | 3/2018 | Luger | .................. | H04L 63/145 |
| 2018/0309772 A1* | 10/2018 | Song | ..................... | H04L 63/101 |
| 2019/0312890 A1* | 10/2019 | Perilli | ................... | G06N 20/00 |
| 2021/0092153 A1* | 3/2021 | Wei | .................... | H04L 63/1458 |

\* cited by examiner

DETECTING A REMOTE EXPLOITATION ATTACK

TECHNICAL FIELD

The present invention relates to the detection of a remote exploitation attack on a computer system and in particular to a method and apparatus for performing such detection.

BACKGROUND

"Remote exploitation" is a technique used by attackers to take advantage of a vulnerability in the operating system or some application on a target computer system to achieve arbitrary code execution on the target system. An attack will typically involve sending specifically crafted data to the target system via a network connection. Remote exploitation is interesting for attackers as it allows them to achieve code execution on their intended target and does not require them to use less reliable attack techniques such those relying on social engineering, e.g. phishing, and nor does it require a knowledge on the part of the attacker of credentials for the target system. Once inside a target organization, remote exploitation may allow an attacker to freely move laterally to any machine that has a suitable vulnerability.

An example of the severe threat presented by unpatched vulnerabilities that enable remote exploitation is the havoc caused by the EternalBlue SMB-exploit (Server Message Block) leaked to the public in April 2017. Whilst SMB is a network transport protocol that requires authentication (e.g. using the Kerberos protocol), the exploit allowed this to be defeated. The exploit was promptly adopted by malware authors and used to spread ransomware such as WannaCry.

Typically, for a target system to be able to defend against remote exploitation of an operating system vulnerability, the vulnerability needs to be patched or at least the public made aware of it so that it can be mitigated using, for example, updated firewall rules. Network traffic can also be analyzed to defend against known exploit code, but that is an entirely reactive mode of defence and is likely to be ineffective against any vulnerability discovered by an attacker that has not yet been made public.

A solution is desirable that detects remote exploitation attacks generically using a proactive method that does not require knowledge of the exact vulnerability or target code.

SUMMARY

According to a first aspect of the present invention there is provided a method of protecting a computer system against remote exploitation attacks performed over a network to which the computer system is connected. The method comprises:
 a) identifying a network connection that is not associated with a successful authentication and which carries a traffic level in excess of a predefined threshold;
 b) reporting the identified network connection as a real or potential remote exploitation attack; and
 c) taking an action or actions to mitigate against the real or potential remote exploitation attack.

The computer system that is being protected may be a system utilising a Windows® operating system, with said network connection being a connection associated with one of the following services: SMB, RDP, and RPC.

In an embodiment, all of said steps a), b) and c) may be carried out at the computer system. In an alternative embodiment, one or more of these steps may be carried out at a remote computer using data provided to it by the computer system being protected.

The predetermined threshold may be selected from a set of predefined thresholds associated with respective services and/or protocols facilitating network connections.

The authentication may be an operating system level authentication. Alternatively, the authentication may be an application level authentication.

According to a second aspect of the present invention there is provided a computer program for implementing the method of the above first aspect. The program may be configured as a third party application to be run under the control of an operating system of the computer system.

According to a third aspect of the present invention there is provided apparatus for protecting a computer system against remote exploitation attacks performed over a network to which the computer system is connected. The apparatus is configured to:
 a) identify a network connection that is not associated with a successful authentication and which carries a traffic level in excess of a predefined threshold;
 b) report the identified network connection as a real or potential remote exploitation attack; and
 c) take an action or actions to mitigate against the real or potential remote exploitation attack.

Whilst the apparatus may be a standalone unit coupled to the network, it is more likely incorporated in whole of in part into the computer system, in which case the apparatus comprises a processor or processors and memory of the computer system configured to perform the required tasks.

DETAILED DESCRIPTION

Embodiments of the invention described below provide protection for computer systems against remote exploitation attacks. Examples of such computer systems are desktop computers, servers, laptops, smartphones etc. Typically, these computer systems implement an operating system and one or more applications. A remote exploitation attack is intended to take advantage of a vulnerability that the attacker has identified in the operating system or an application. The vulnerability may exist in an operating system or application service that provides a connection between the computer system and a peer node over a network to which the system is connected, where the service expects authentication of the ends of the connection for normal operation. More specifically, the remote exploitation attack takes advantage of the vulnerability to transfer code over the connection, and run it on the computer system, without requiring authentication.

By way of example, embodiments of the invention may be used to protect a computer system operating the Microsoft Windows® operating system, where services such as SMB, RDP, and RPC are intended to provide authenticated connections between the computer system and an end point over a network.

Embodiments of the invention are typically implemented using software installed on the computer system, for example as a component of a security service such as the F-Secure® Internet security service. The software monitors network connections and authentications on the computer system. Based on information learned by combining details from the network connection and related authentication events, network connections caused by, or suspected to be caused by, remote exploitation can be identified. Event data used for detection can be processed either locally or sent to another machine for centralized processing.

Figure 1:
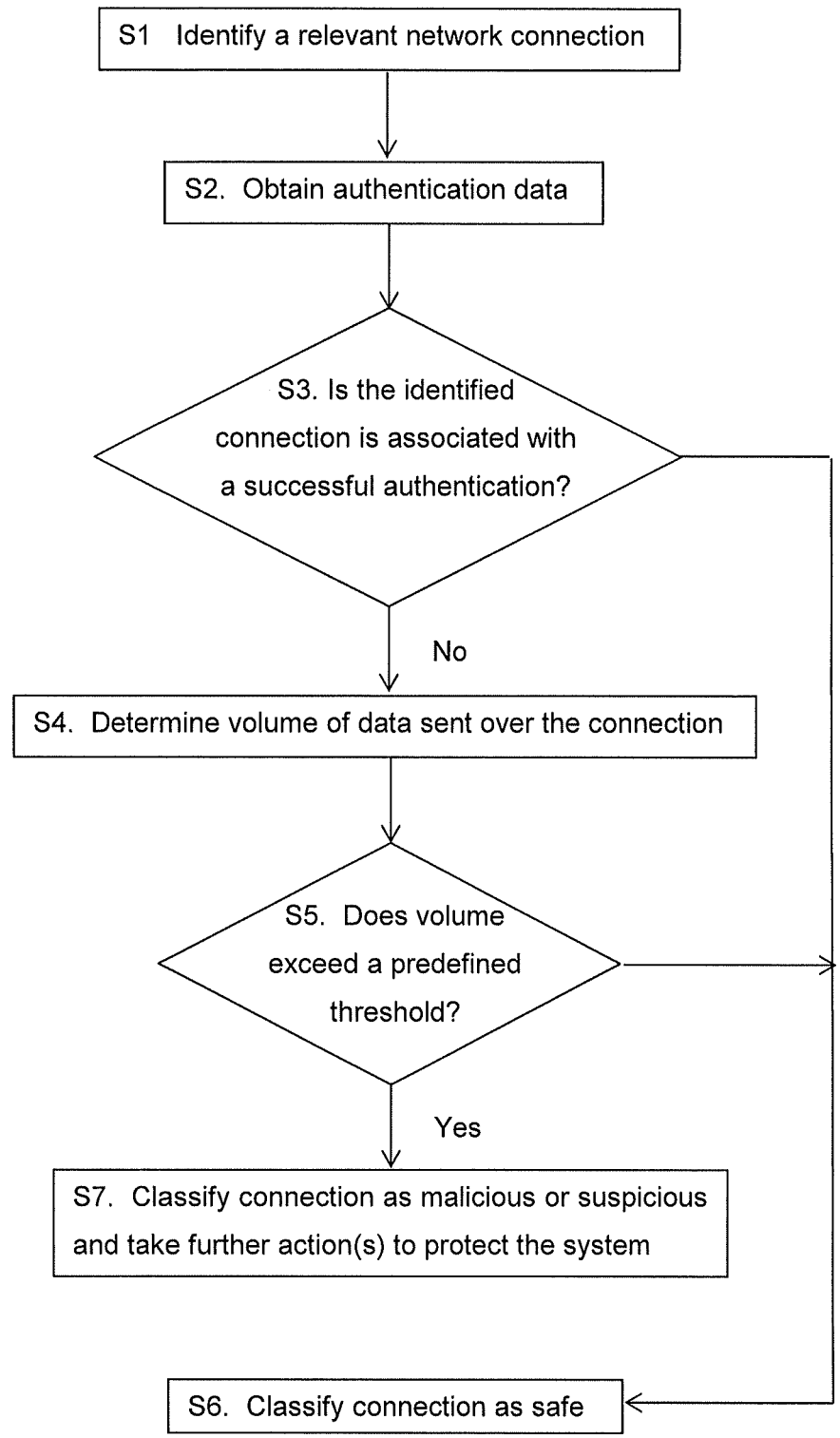
FIG. 1 is a flow diagram illustrating a method of detecting and mitigating against a remote exploitation attack.

FIG. 1 is a flow diagram illustrating at a high level the steps required to identify a remote exploitation attack. These steps are all implemented on the computer system that is being protected in this embodiment.

S1. Identify relevant network connections (connections belonging to certain services or applications). This may be done by looking at the local port of the network connection, the process receiving the network connection, or a combination of the two. An identified network connection will be associated with an IP address of the remote end point and possibly a domain name.

S2. Obtain authentication data for relevant connections. Authentications are automatically logged, for example by Windows for SMB connections, and will typically contain the IP address or domain name from where the authentication request originated. This IP address or domain name can be used to match authentications with the inspected network connections (connection information includes the IP address and/or domain name of the remote machine). Authentication data may include a timestamp indicating when authentication occurred.

S3. For each network connection that is identified, determine if an associated authentication exists. This may involve comparing a timestamp of the authentication data with a time at which the connection was commenced and/or terminated in order to avoid assuming that a connection is authenticated when in fact the authentication is old or otherwise expired. If it is determined that the inspected network connection is associated with a preceding successful authentication originating from an end point of the network connection, the connection is deemed not to be associated with a remote exploitation attack. If this is not true however, i.e. the network connection is not associated with a preceding successful authentication originating from an end point of the network connection, then the network connection is considered to be suspect and further checks are carried out.

S4. It is possible, or even likely, that connections that have not previously been successfully authenticated are not malicious, as the target of the connection, either the computer system where the scanning is being performed or the remote end point, may have responded to a connection request with an error message or code. In order to distinguish between normal failed connections and successful remote exploitations, the amount of incoming data transferred over the connection needs to be inspected.

S5. Only if the amount of incoming data is significant is the connection deemed to be malicious. The precise threshold that is considered significant is likely to depend on the process or protocol associated with the connection. It may be determined by analysing real-world data over some long period of time. However, merely as an example, a suitable threshold might be in the region of 1 to 2 KB. A check can also be made regarding the amount of outgoing data. This might be useful in the case where a very small initial shellcode within the exploit has already sent documents or other data from the exploited endpoint back to the attacker, and no further incoming payloads arrive leading to the incoming data amount remaining very small.

S6. If it is determined at either step S2 or S3 that a connection is not malicious, no further action is taken (by the security service).

S7. If it is determined at Step S3 that a connection is malicious, one or more actions are taken to protect the system. Such actions may include:
  terminating the network connection
  terminating the process that received the network connection
  modifying firewall rules to allow only a very limited set of connections to prevent further propagation or remote access
  isolating the exploited machine from the network by disabling all network adapters Considering by way of example the Windows operating system, at least in the cases of Windows Vista® and subsequent versions of the operating system, the Windows Filtering Platform (WFP) allows third party applications (and drivers) to tie into the processing and filtering pipeline of the TCP/IP network stack. WFP is intended for use by firewalls and by other packet-processing or connection-monitoring components, such as security software. WFP makes available various APIs that allow third party components to collect the information required to implement remote exploitation defence and to take the necessary mitigating actions. For example, so-called "Callout" drivers that process network data streams can be used to monitor network connections and also close them when necessary using the FwpsFlowAbort API. In addition to closing a connection, drivers such as these can drop network packets or modify the content of a connection, providing an alternative to closing the connection entirely.

In order to obtain authentication data for connections, a third party monitoring application or driver may take advantage of the Windows Event Log. This log has its own API that can be used to read, write, delete or monitor log entries. In this case EvtSubscribe API can be used to subscribe to the 'Security' channel that receives and stores authentications, which the monitoring application can then inspect as they happen. Another option is the EvtQuery API that can be used to retrieve log entries at a later time.

Figure 2:
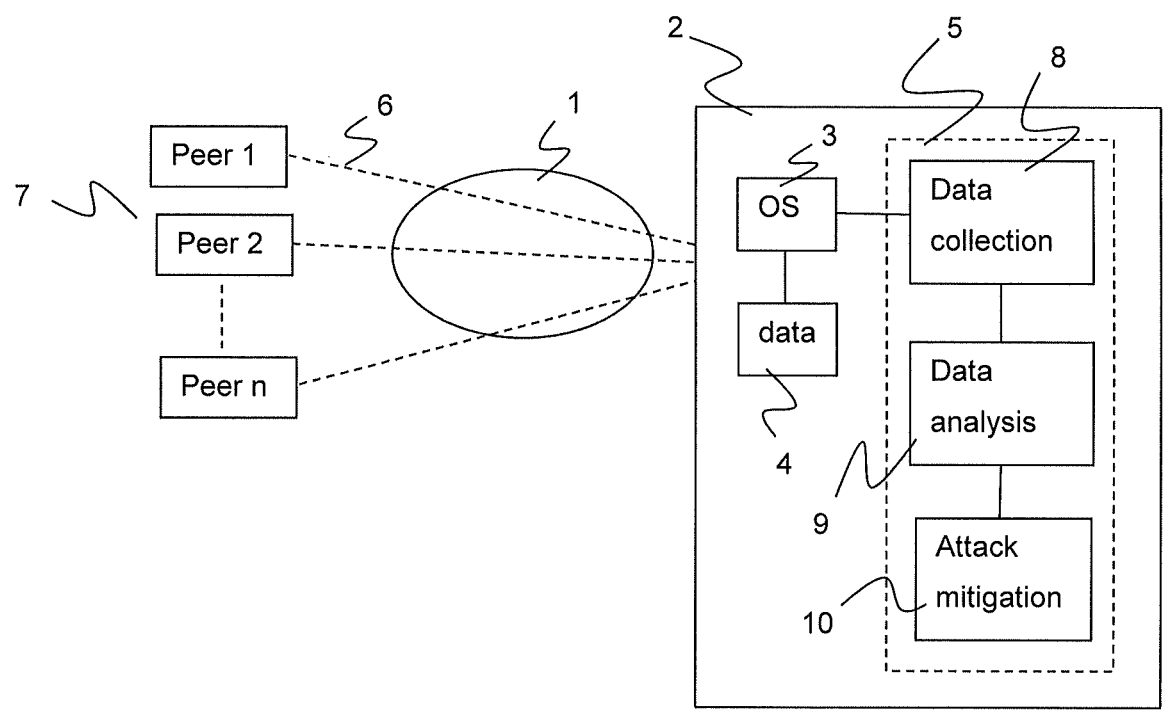
FIG. 2 illustrates a network architecture including a computer system on which a third party security application is operated.

FIG. 2 illustrates a network architecture comprising a network 1 which may be, for example, a local area network, a wide area network, a wired or wireless network, the Internet, or any combination of these. Connected to the network is a computer system 2 which might be considered to be, in this example, a client computer such as a desktop computer. Installed on the computer is an operating system (OS) 3 which performs all of the usual tasks expected of an operating system. The OS 3 is able to store and access data in various memory locations of the computer system, indicated collectively by reference numeral 4 in the Figure. Also installed on the computer system 2 is a third party security application 5. Other applications and software components are also installed on the computer system but these are not shown in the Drawing for simplicity. It will be appreciated that the computer system 3 will comprise multiple hardware components including memories, processors, etc, as well as multiple software components. Again, these are not shown in the Figure for simplicity.

As will be clear from the discussion above, the OS, and possibly application installed on the computer system, provides a service or services to allow connections 6 to be established between the computer system and peer nodes 7. The functionality required in order to inspect these connections to determine if they are associated with a remote exploitation attack, or at least have the potential for such, has already been described with reference to FIG. 1. FIG. 2 illustrates various functional components of the third party security application 5 required to implement this functionality. These functional components may also be components of an apparatus integrated into the computer system 2. The functional components comprise a data collection unit 8 which interfaces with the OS in order to identify connections and obtain various required data, a data analysis unit 9 which is able to analyse the identified connections using the collected data to determine if they are malicious or benign, and an attack mitigation unit 10 which is able to take actions to mitigate against a detected attack.

The approach presented here is especially suited to protecting computer systems using a Windows® operating system. Windows default services (SMB, RDP; RPC etc.) require authentication, and are automatically logged by Windows including the information required to implement the remote exploitation protection. Network connections and authentications can be monitored reliably with third party software. Nonetheless, the approach can be generalized to any operating system where the required information is available or can be otherwise acquired (from various log files, with an operating system modification or extension or some other method).

It will be appreciated by the person of skill in the art that various modifications may be made to the above described embodiments without departing from the scope of the present invention. For example, whilst the data that must be collected to perform the analysis must be collected at the computer system being protected, the collected data may be sent to a remote computer system for analysis. The result may be communicated back to the protected system, together with any actions to be taken, e.g. to mitigate an attack. According to a further alternative embodiment, the successful authentication that is used to rule out an attack is an authentication carried out at the application level. This may involve inspecting application logs in order to verify that a remote IP address or domain name is associated with authenticated or otherwise valid traffic.

The invention claimed is:

1. A method, comprising:
   protecting a computer system against remote exploitation attacks performed over a network to which the computer system is connected, comprising:
   a) identifying a network connection which carries a traffic level in excess of a predefined threshold depending on a network transport protocol associated with the network connection that is not associated with a preceding authentication allowed for the network connection originating from an end point of the network, wherein the identifying is based at least on a time the network connection was commenced or terminated not matching an authentication data timestamp identifying the network connection;
   b) in response to determining that the network connection is associated with a previous successful authentication with the authentication data timestamp or did not carry an amount of traffic greater than the predefined threshold, reporting the identified network connection as a non-malicious connection;
   c) in response to determining that the network connection is not associated with a previous successful authentication with the authentication data timestamp or resulted an error code and carries the traffic level in excess of the predefined threshold, reporting the identified network connection as a real or potential remote exploitation attack; and
   d) taking at least one action comprising at least one of terminating or modifying the identified network connection to mitigate against the real or potential remote exploitation attack.

2. The method according to claim 1, wherein the computer system is a system utilizing a Windows® operating system.

3. The method according to claim 2, wherein said network connection is a connection associated with one of the following services: server message block (SMB), remote desktop protocol (RDP), and remote procedure call (RPC).

4. The method according to claim 1, steps a), b) and c) all being carried out at the computer system.

5. The method according to claim 1, wherein said predefined threshold is selected from a set of predefined thresholds associated with respective services and/or protocols facilitating network connections.

6. The method according to claim 1, wherein said authentication is an operating system level authentication.

7. The method according to claim 1, wherein said authentication is an application level authentication.

8. A computer program embodied on a non-transitory memory, the computer program executed by at least one processor to perform operations, comprising: protecting a computer system against remote exploitation attacks performed over a network to which the computer system is connected, comprising:
   a) identifying a network connection which carries a traffic level in excess of a predefined threshold depending on a network transport protocol associated with the network connection that is not associated with a preceding authentication allowed for the network connection originating from an end point of the network, wherein the identifying is based at least on a time the network connection was commenced or terminated not matching an authentication data timestamp identifying the network connection;
   b) in response to determining that the network connection is associated with a previous successful authentication with the authentication data timestamp or did not carry an amount of traffic greater than the predefined threshold, reporting the identified network connection as a non-malicious connection;
   c) in response to determining that the network connection is not associated with a previous successful authentication with the authentication data timestamp or resulted an error code and carries the traffic level in excess of the predefined threshold, reporting the identified network connection as a real or potential remote exploitation attack; and
   d) taking at least one action comprising at least one of terminating or modifying the identified network connection to mitigate against the real or potential remote exploitation attack.

9. The computer program according to claim 8 and being configured as a third party application to be run under the control of an operating system of the computer system.

10. An apparatus, comprising:
    at least one processor;
    at least one memory including program code, wherein the at least one memory including the program code is configured with the at least one processor to cause the apparatus to:

protect a computer system against remote exploitation attacks performed over a network to which the computer system is connected, comprising:

a) identifying a network connection which carries a traffic level in excess of a predefined threshold depending on a network transport protocol associated with the network connection that is not associated with a preceding authentication allowed for the network connection originating from an end point of the network, wherein the identifying is based at least on a time the network connection was commenced or terminated not matching an authentication data timestamp identifying the network connection;

b) in response to determining that the network connection is associated with a previous successful authentication with the authentication data timestamp or did not carry an amount of traffic greater than the predefined threshold, reporting the identified network connection as a non-malicious connection;

c) in response to determining that the network connection is not associated with a previous successful authentication with the authentication data timestamp or resulted an error code and carries the traffic level in excess of the predefined threshold, reporting the identified network connection as a real or potential remote exploitation attack; and d) taking at least one action comprising at least one of terminating or modifying the identified network connection to mitigate against the real or potential remote exploitation attack.

11. The apparatus according to claim 10, the apparatus being part of said computer system.

12. The apparatus according to claim 10, wherein the computer system is a system utilising a Windows® operating system.

13. The apparatus according to claim 12, wherein said network connection is a connection associated with one of the following services: server message block (SMB), remote desktop protocol (RDP), and remote procedure call (RPC).

14. The method according to claim 1, wherein taking at least one action comprising terminating or modifying the identified network connection comprises modifying firewall rules to limit connections with the identified network connection.

15. The method according to claim 1, wherein taking at least one action comprising terminating or modifying the identified network connection comprises disabling network adapters to isolate machines exploited by the identified network connection.

* * * * *